Nov. 2, 1943.  A. RINGER  2,333,389
STEREOGRAPHIC PRINTER
Filed June 18, 1941  3 Sheets-Sheet 3
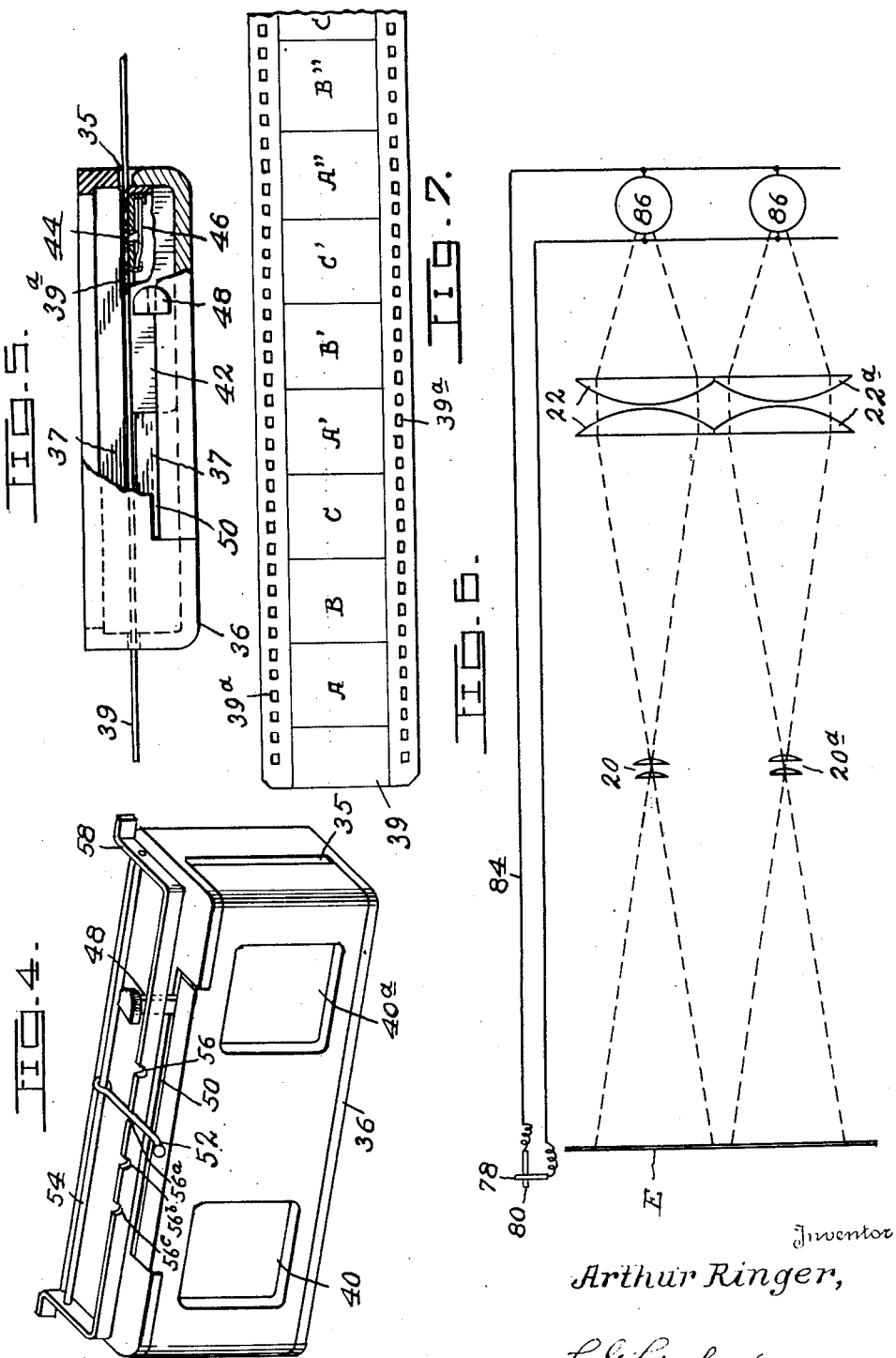

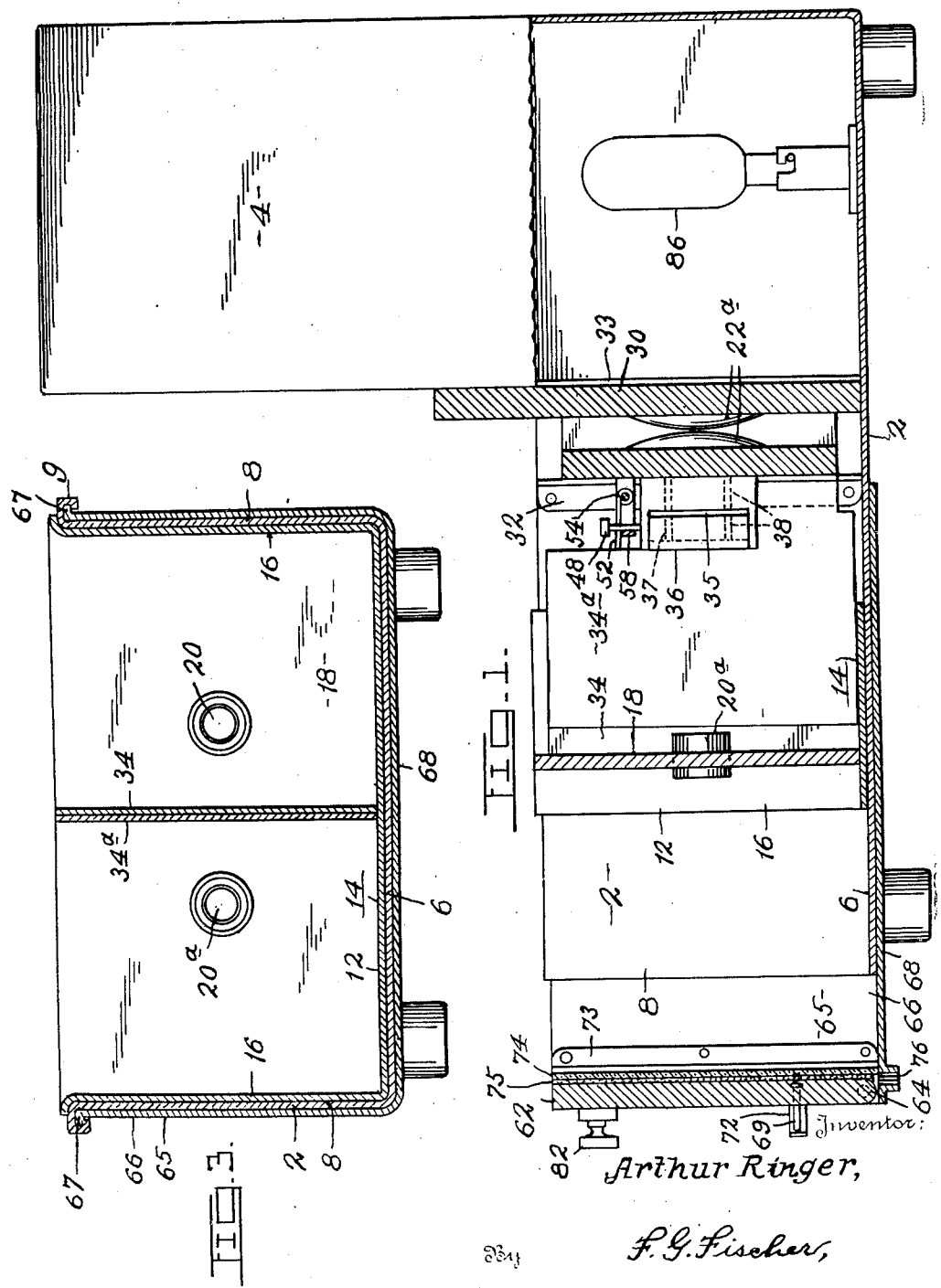

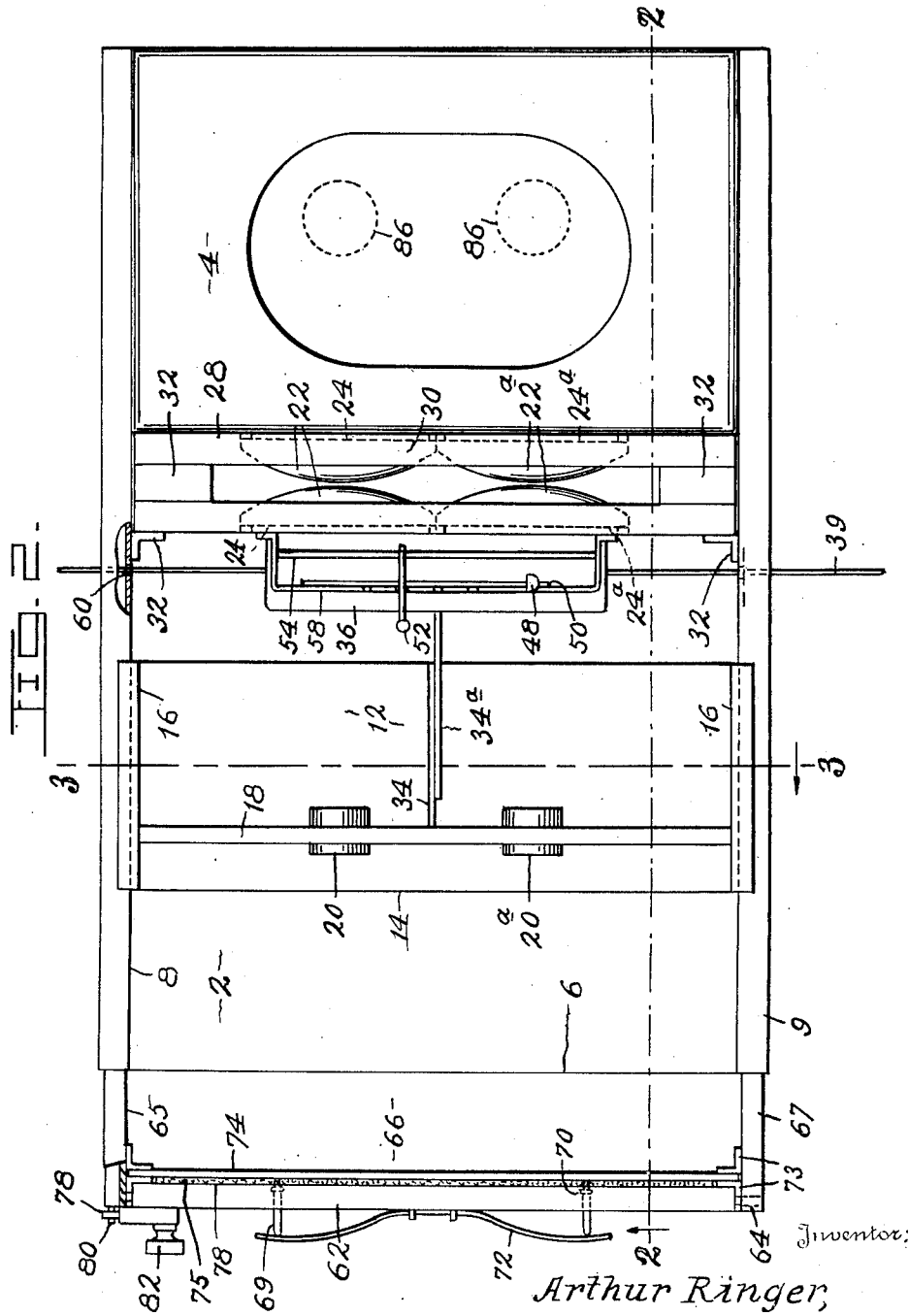

Patented Nov. 2, 1943

2,333,389

UNITED STATES PATENT OFFICE 2,333,389

STEREOGRAPHIC PRINTER

Arthur Ringer, Paola, Kans.

Application June 18, 1941, Serial No. 398,587

4 Claims. (Cl. 88—24)

My invention relates to the printing of stereoscopic pictures on sensitized material from transparent negatives such as films, or Kodachromes and Dufaycolors taken with a stereoscopic camera. When the stereoscopic pictures are printed in contact with the negative and viewed through a stereoscope, a distorted effect is obtained, because the negative image on the right hand side was focused by the left hand lenses, and the image on the left hand side was focused by the right hand lenses of the camera.

To overcome the distorted effect it has been the practice to cut the printed sheet into two parts so that the right and left hand pictures may be transposed preparatory to mounting them side by side upon a card to provide a stereograph that can be properly viewed through a stereoscope.

The principal object of my invention is to provide a stereograph printing apparatus with a lens system that will render unnecessary and eliminate the manual operation of cutting the printed sheet and transposing the pictures. I accomplish this by providing a twin projection system for simultaneously projecting the right hand image upon the right hand side and the left hand image upon the left hand side of the sensitized material. This leaves the pictures side by side in inverted position, but when the print is turned right side up the picture projected by the right hand lenses will appear on the left hand side and the one projected by the left hand lenses will appear on the right hand side in erect position, so that when viewed through a stereoscope the pictures will resemble the original subject matter from which the negative was taken.

Another object of my invention is to provide a printing apparatus in which the focal distance between the lenses and also between the negative and the sensitized material may be varied to either enlarge or reduce the size of the pictures during projection thereof upon the sensitized material.

A further object of my invention is to provide a framing device having a pair of apertures arranged side by side and spaced to register with any complementary pair of images on a negative, and propeller means for intermittently advancing the negative to bring succeeding pairs of complementary images into registry with the apertures.

A further object of my invention is to provide a gage that may be adjusted to one position to arrest the propeller after it has advanced a negative with large images the proper distance to bring a pair into registry with the apertures of the framing device, or adjusted to another position to arrest the propeller after it has advanced a negative with smaller images the proper distance to bring a pair into registry with the apertures. For example, if there are three small pairs of complementary images in a given space, the gage may be set to stop the propeller after it has been advanced one-third the distance required for the movement of a negative having larger images, each of which is equal in width to three of the smaller images. Thus the operator is enabled to quickly and accurately operate the propeller in a moderately dark room where the stereoscopic pictures are printed and developed.

The invention will be understood from the following description taken in connection with the accompanying drawings forming part of the specification, with the understanding that the invention is not confined to any strict conformity with the showing of the drawings but may be changed or modified within the scope of the invention as claimed.

In the drawings—

Fig. 1 is a longitudinal section of my printing apparatus on line 1—1 of Fig. 2, with the upper portion of the lamp house in elevation.

Fig. 2 is a plan view of the apparatus.

Fig. 3 is a cross section on line 3—3 of Fig. 2.

Fig. 4 is a detail perspective view of a framing device with a negative propeller and a gage for arresting the propeller.

Fig. 5 is a broken plan view partly in section of the framing device with the propeller partly broken away to disclose a spring-pressed ratchet tooth engaging a negative.

Fig. 6 is a diagram of the lens system and an electric light circuit associated therewith.

Fig. 7 is a broken detail of a film having a series of complementary images.

In carrying out my invention I employ a body 2 provided at its rear portion with a lamp-house 4. The body 2 is constructed of suitable material such, for instance, as sheet metal bent into U-form to provide a bottom 6 and side walls 8. The upper portion of the side walls are folded as shown by Fig. 3 to provide guides 9 for a purpose which will hereinafter appear.

A lens carrier 12 is spaced in advance of the lamp house 4, and, like the body 2, may be constructed from sheet metal and bent into U-form to provide a bottom 14 and side walls 16 for slidable engagement with the bottom 6 and the side walls 8, respectively, of the body 2. The lens carrier 12 has a fixed vertically positioned plate 18 equipped in the present instance with two pairs of object lenses 20, 20a, arranged side by side.

The object lenses 20 are arranged with their focal centers in alinement with the focal centers of a pair of condensing lenses 22 and the object lenses 20a are arranged with their focal centers in line with the focal centers of a pair of condensing lenses 22a arranged beside the lenses 22. The condensing lenses 22, 22a are fixed in the circular walls of apertures 24, 24a, respectively, of a lens holder 30, removably mounted between the front wall of the lamp-house 4 and upright guide members 32 secured to the respective side walls 8 of the body 4. The front wall of the lamp house 2 has an opening 33 in its lower portion for the passage of light used in conjunction with the lens system in projecting negative images upon sensitized material.

Slidably engaging partition walls 34, 34a are fixed to the confronting sides of the plate 18 and the lens holder 30, respectively, to prevent rays of light which pass through the condensing lenses 22 from the lamp house from crossing over to the object lenses 20a, or rays of light passing through the condensing lenses 22a from crossing over to the object lenses 20.

The front side of the lens holder 30 is provided with a framing device 36 which may be either fixed to, or removably attached to said front side so that interchangeable framing devices of different sizes with larger or smaller apertures may be used to accommodate negatives and images of different sizes. The framing device 36 has slots 35 at each end and upper and lower guides 37, 38, respectively, spaced apart to provide a channel for the passage of a negative which may be in the form of a transparent film 39 having series of perforations 39a and areas A, A'; B, B', and C, C', for a plurality of pairs of complementary images, not shown. The front wall of the framing device 36 has a pair of apertures 40, 40a, each about the size of an area on the film 39 and spaced to register with the focal centers of the condensing lenses 22, 22a, respectively, and any pair of the complementary images on the film. The rear of the framing device is open so that rays of light projected from the lamp house 4 may pass through the negative 39 and the apertures 40, 40a, respectively.

A manually controlled reciprocatory propeller 42 is slidably mounted between the top wall and an upper guide 37 of the framing device 36 and provided with a ratchet-tooth 44 adapted to cooperate with the upper series of perforations 39a of the film 39 in advancing the same through the framing device to bring any pair of images in registry with the apertures 40, 40a. A spring 46 presses the ratchet-tooth towards the perforations 39a, but each time the propeller 42 is moved backward to the starting point at the right, Figs. 2, 4 and 5, the ratchet-tooth 44 slides past the perforations 39a and thus avoids carrying the film backward therewith. A handle 48 which extends through a longitudinal slot 50 in the upper wall of the framing device, is provided to operate the propeller 42.

Some negatives have images so small that two or three will only equal the width of each larger image on another negative and since the apparatus is used in a dark room it is desirable to employ suitable means such as a gage 52 to accurately limit the length of each advance movement of the propeller 42 to correspond to the width of each image. The gage 52 extends across the path of the handle 48 and is slidable upon a rod 54, so that it may be set to limit the forward movement of the propeller. After being properly set the gage 52 is held from accidental movement by one of a plurality of notches 56, 56a, 56b and 56c, spaced in a bracket 58 secured to the lens holder 30. For convenience in handling long films while being passed through the framing device 36, slots 60 are formed in the side walls 8 of the body 2 for passage of such films.

Any suitable means may be provided for supporting photographically sensitized material E in position to have images projected thereon. In the present instance I have shown a platen 62 for that purpose, which is provided at its lower end portions with pivots 64 mounted in the side walls 65 of a carriage 66 of U-form slidably mounted on the body 2 and provided with upper marginal flanges 67 slidable in the guides 9. When placed in position the sensitized material rests upon pins 69 projecting freely through transverse openings in the platen 62 and provided near their reduced forward terminals with peripheral shoulders 70. A spring 72, secured to the rear side of the platen, yieldably holds the pins 69 in advanced position to support the sensitized material until it is pressed by the platen against a transparent plate 74 removably mounted between vertical guides 73 secured to the side walls 65 of the carriage 66.

The face of the platen 62 is covered with a sheet of loosely woven fabric 75 to prevent the printed sensitized material from adhering thereto when the platen is swung downward to release the print, but should the print stick to the fabric it is pushed away by the shoulders of the pins 69 which are advanced by the spring 72. When the print is released it falls through a slot 76 in the bottom 68 of the carriage 66 and may be deposited in a receptacle or upon a conveyer, not shown, preparatory to being developed.

When the platen 62 is swung upward to press a sheet of unprinted sensitized material against the transparent plate 74, it is secured in raised position by a latch 78 and a keeper 80, the former of which is secured to a knob 82, operably mounted on the platen, and the latter to an adjacent wall of the carriage 66. The latch 78 and the keeper 80 constitute a switch for controlling an electric circuit 84 containing a pair of light bulbs 86, located side by side in the lamp house 4 and in line with the focal centers of the respective sets of condensing lenses 22, 22a, and object lenses 20, 20a. Insulation is provided wherever needed.

If it is desired to make the stereograph pictures the same size as the negative images the lens carrier 12 is moved to position the object lenses 20, 20a midway between the condensing lenses 22, 22a, and the sensitized material on the platen 62. If the pictures are to be enlarged the lens carrier 12 is moved closer to the condensing lenses and the platen carriage 66 is moved farther to the left, Figs. 1 and 2. If the pictures are to be reduced the lens carrier 12 is moved a greater distance to the left and the platen carriage is moved to the right until the images and the sensitized material are in focus.

If desired the platen 62 may be equipped with a framing device, so that the images on a negative film being passed through the framing device 36 may be projected upon other films being passed at the same time through the framing device on the platen.

Having thus described my invention, what I claim and desire to secure by Letters Patent is:

1. An apparatus for printing pictures from negatives having one or more pairs of complementary images comprising a body, a lamp house associated with said body and provided with twin lamps spaced apart to register with any pair of said complementary images, a lens holder in the body having a set of twin lenses spaced in front of said lamps, a framing device associated with said lens holder having two apertures spaced in front of said lenses and provided with an opening for the passage of a negative, means associated with said framing device for advancing the negative to bring succeeding complementary images into registry with said apertures, a second set of twin lenses spaced in front of the framing device and having their focal centers in alinement with the focal centers of the first set of lenses, a carrier for the second set of lenses slidably mounted in the body to move said second set of lenses relative to the framing device, a carriage slidably associated with the body, a platen pivotally mounted in the carriage and spaced in front of the second set of lenses, electric switch members for securing said platen in position to support sensitized material upon which complementary images are projected by the lamps and the two sets of lenses, one of said switch members being mounted upon the carriage and the other switch member being mounted upon the platen, and an electric circuit connected to the lamps and controlled by said switch members.

2. In apparatus for printing pictures from negatives having one or more pairs of complementary images, a body, a carriage mounted on said body and provided with a bottom, an upright transparent plate mounted in said carriage, a platen pivotally mounted in the carriage and adapted to be lowered to receive sensitized material and raised to press said material against the transparent plate to support the material in position to have a pair of the images projected thereon, spring-pressed pins extending freely through apertures in the platen to support the sensitized material while being raised into contact with the transparent plate, shoulders on the forward portion of said pins for dislodging the printed material when the platen is lowered to receive the sensitized material, and a delivery slot in the bottom of the carriage through which the printed sheet falls when dislodged from the platen.

3. In a stereographic printer, a lens holder, a framing device mounted on the front side of said lens holder and provided with two apertures and a channel which latter provides a passageway for image bearing films some of which have smaller images than the others, a reciprocatory propeller provided with a handle and adapted to move the film different distances in accordance with the size and spacing of the images, a bracket secured to the lens carrier and provided with a plurality of suitably spaced notches, and a gage adjustably mounted on said bracket and adapted to enter any of the notches, said gage being arranged to extend across the path of the handle to check the forward movement of the propeller.

4. In a stereographic printer, a carriage having a slot in its bottom portion, a transparent plate mounted in said carriage adjacent to the slot, a platen arranged adjacent to the slot and hingedly connected to the carriage so that it may be raised or lowered, said platen being adapted to hold sensitized material in position for exposure against the transparent plate, pins freely mounted in apertures in the platen, and spring means on the platen adapted to cause said pins to dislodge the material after exposure so that it may fall through the slot when the platen is lowered.

ARTHUR RINGER.